United States Patent [19]

Flagg

[11] 4,040,644
[45] Aug. 9, 1977

[54] REFUSE BAG CARRIER

[76] Inventor: Raymond C. Flagg, P.O. Box 1692, Medford, Oreg. 97501

[21] Appl. No.: 697,134

[22] Filed: June 17, 1976

[51] Int. Cl.$^2$ .............................................. B62B 1/12
[52] U.S. Cl. ..................................... 280/659; 248/98; 280/47.26; 280/79.2; D12/34
[58] Field of Search .............. 280/659, 47.26, 79.1 A, 280/79.1 R, 79.2; 248/97, 98, 99, 100; D12/32, 34

[56] References Cited
U.S. PATENT DOCUMENTS

| 639,120 | 12/1899 | Wester | 248/97 |
|---|---|---|---|
| 3,718,337 | 2/1973 | Vosbikian | 280/47.26 |

FOREIGN PATENT DOCUMENTS

| 1,288,503 | 1/1969 | Germany | 248/99 |
|---|---|---|---|
| 365,296 | 1/1932 | United Kingdom | 248/97 |

Primary Examiner—Joseph F. Peters, Jr.
Assistant Examiner—Michael J. Forman
Attorney, Agent, or Firm—Clarence M. Crews

[57] ABSTRACT

The present invention relates to simple, convenient, versatile and inexpensive means for collecting refuse of any character which tends to accumulate inside or outside a residence or other building, and depositing it in an appropriate location for disposal. A portable bag carrying and bag spreading device, adjustable both as to height and lateral dimensions, is provided, the device being adaptable to a wide variety of bag heights and bag widths.

7 Claims, 7 Drawing Figures

REFUSE BAG CARRIER

This invention relates to a refuse collecting device usable with any one of a wide variety of disposable bags for collecting useless material in the bags and lodging the bags in a convenient location for pickup.

For dealing with bags of relatively limited cross-sectional dimensions, provision is made of a spring adapted for connection to one portion of the margin of the bag at the open end of the bag, a slotted member for connection to a diametrically opposite portion of the bag mouth, and a bag mouth spreader adapted to be fixed in bag mouth spreading condition.

In dealing with bags of different lengths the spreading means are adapted for heightwise adjustment.

Alternative bag mouth spreading means are provided as a standard but relocatable structure for spreading the mouths of bags of large cross-sectional dimensions.

Other objects and advantages will hereinafter appear.

In the drawing which forms part of this specification,

FIG. 1 shows in side elevation a bag 10 of comparatively limited depth and cross-sectional dimensions secured in place on a bag carrying and spreading device generally designated 12.

Figure 1:
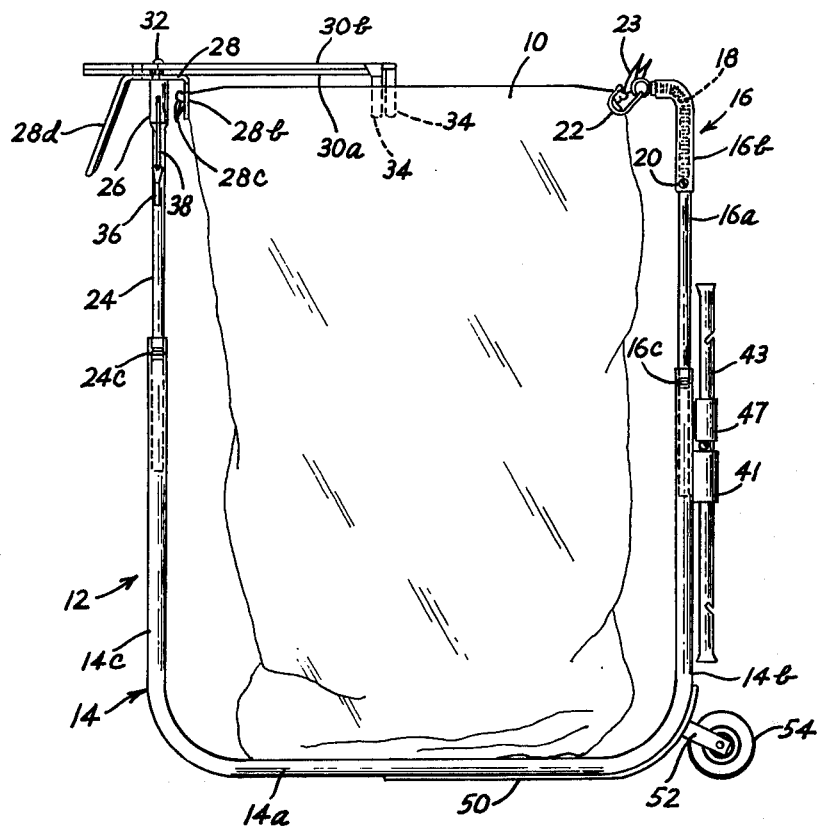
FIG. 1 is a view in side elevation, showing a bag of relatively small dimensions in place on the carrier, but before the mouth of the bag has been spread.
Figure 2:
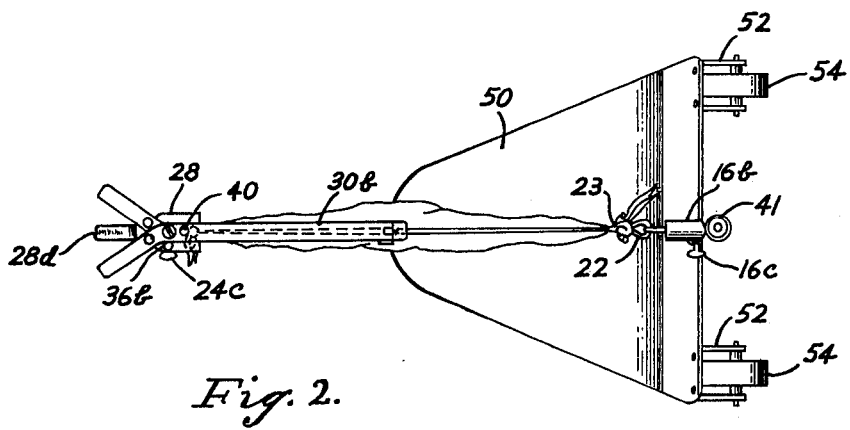
FIG. 2 is a plan view of the structure of FIG. 1 in the condition of FIG. 1.

The device 12 comprises an unitary frame 14, desirably an U-shaped member. The frame 14, which is desirably tubular, comprises a base portion 14a, an upstanding forward portion 14b and an upstanding rear portion 14c.

The forward portion 14b telescopically carries a first upstanding device 16. The device 16 consists of two parts, a straight part 16a whose lower end is received in 14b and fixed in adjusted position by a set screw 16c. The upper end of 16a is fixedly secured to member 16b in any suitable manner as by welding.

The member 16b is hollow and is curved toward the left at its upper end. It encloses a freely extensible coil spring 18 which is anchored at its lower end by a screw 20, and has attached at its upper end a bag knot anchoring hook 22.

The bag 10 desirably has an anchoring knot 23 formed in the forward portion of its upper margin.

The rear arm 14c of the frame 14 is also hollow. A bag connecting rod 24 is slidably fitted into the upper end of 14c and held adjustably in place by a set screw 24c. The rod 24 has an enlarged upper end portion on which a split sleeve 26 is fitted.

The upper end of the sleeve 26 has welded to it a sheet metal member 28 which is bent down at one end to form a bag anchoring plate 28a. The plate 28a is formed at one end with an angular slot 28b for anchoring a knot 28c which is formed in the upper margin of the bag 10 opposite the knot holding hook 22.

The plate 28 is turned down at its outer end to form a handle 28d. A pair of angular levers 30a and 30b are pivotally secured on the plate 28 by means of a screw 32 which is threaded into the enlargement 26 of the rod 24.

Figure 3:
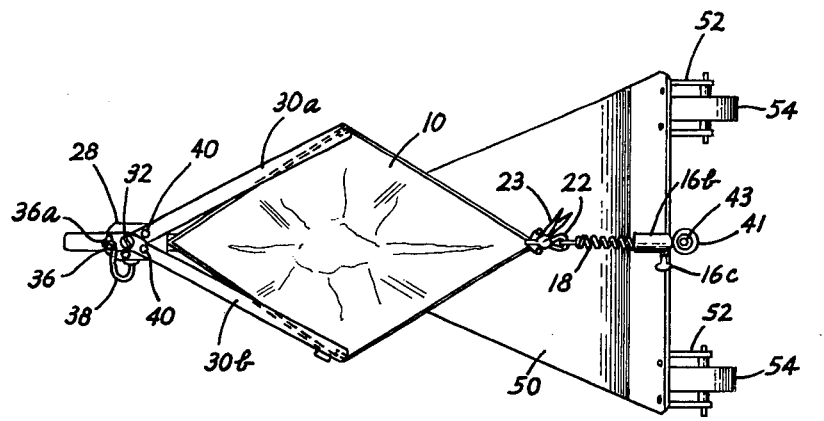
FIG. 3 is a plan view of the structure of FIGS. 1 and 2 but with the parts fixed in bag mouth spreading condition.

The levers 30a and 30b have long arms at one side of the pivot and short arms at the opposite sides of the pivot so that when the short arms coincide the long arms are spread far apart, as seen in FIG. 3. The long arms have rigidly affixed to their outer ends downwardly extending bag spreading fingers 34. The short arms of the levers 30a and 30b have holes formed through them which coincide when the levers are in bag spreading positions. When the levers are so related, locking perforations in the short arms are brought into coincidence, and a locking pin 36 is passed through the perforations in the levers and through a perforation 36a in the plate 28 to keep the mouth of the bag wide open. The locking pin is connected to the enlargement 26 through a chain 38 with freedom for substantial movement.

When the ends of the arms which carry the bag spreading fingers 34 are thus spread the mouth of a small bag is in a wide open condition, as seen in FIG. 3. The margins at the bag mouth are held taut by the spring 18 so that there is no sagging of the bag at its mouth. The spring adapts the device to utilize bags of various perimeters.

Figure 4:
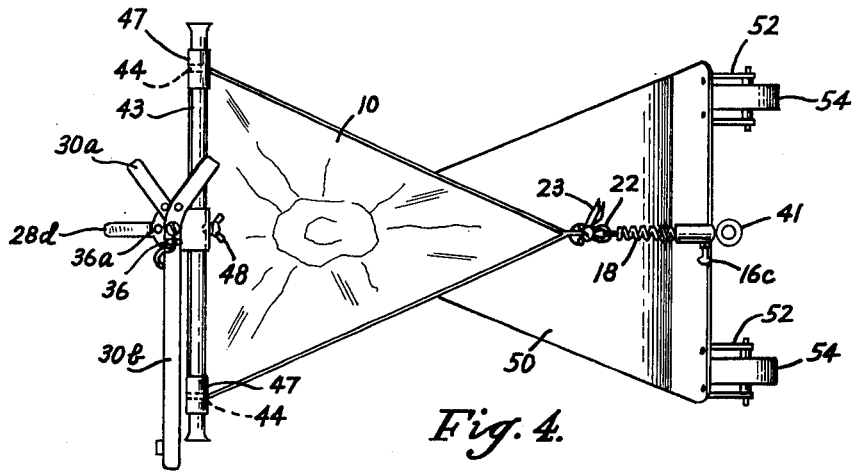
FIG. 4 is a plan view of the carrier structure of FIGS. 1 to 3, but with a tubular member relocated to spread the mouth of a bag of much larger transverse dimensions than the bag of FIGS. 1 and 2.

If a longer and wider bag is to be used, the levers 30a and 30b are first put out of commission by superposing the longer arms of levers 30a and 30b and turning them to point as indicated in FIG. 4. With the pivot of the long arms engaged in an opening 36c, this aligns openings 40 of the long arms with one another and with a perforation 36b in the fixed member 28 so that the pin 36 can be inserted to retain the long arms in the idle, out of the way location indicated in FIG. 4. Alternative means are then utilized for holding the mouth of the larger bag in a wide open condition.

The upstanding member 14b normally carries such alternative means conveniently in an idle out of the way available condition. The member 14b has affixed to its forward face a tube 41 having a slot 42 in its upper margin, the purpose of the tube being to maintain the wide bag spreader mechanism conveniently at hand.

Figures 5, 6, 7:
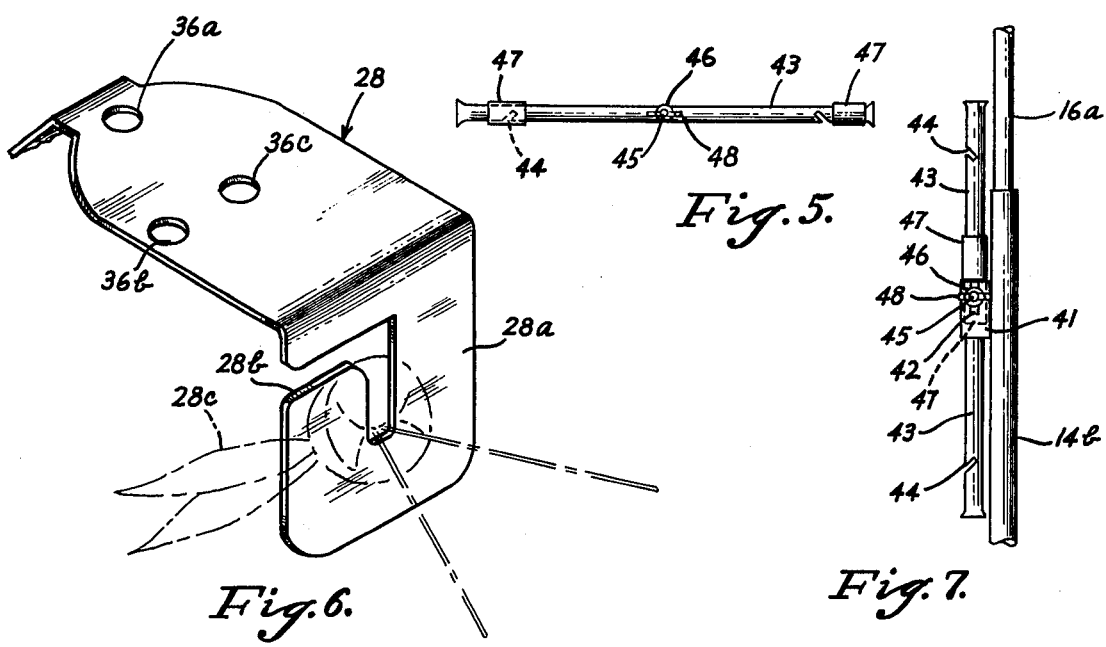
FIG. 5 is a detail plan view of a spreader device, normally idly carried by an upright member at the front of the illustrated structure but which has been shown in FIG. 4 in a position for spreading the mouth of a large bag.
FIG. 6 is a detail view of a slotted member as it appears in use when anchoring a marginal portion of the mouth of a comparatively small bag.
FIG. 7 is a view in side elevation of the spreader of FIG. 5 in its normal, inactive position.

Such wide bag spreader mechanism comprises an elongated tube 43 having at a middle portion a screw 45 which is threaded into and through the tube. A washer 46 is loosely received on the protruding screw stem and a wing nut 48 (FIG. 5) is threaded onto the stem. The screw and washer normally maintain the tube 43 in a fixed idle condition, parallel to the upwardly extending tubular member 14b, as best seen in FIG. 7.

When it is desired to transfer the tube 43 to an operative position, the wing nut 48 is retracted, the tube 43 is withdrawn from the tube 41 and transferred to the member 28a with the shank of the screw 45 extending through the slot of 28a and slots 44 of the tube 43 faced upward or downward. The wing nut 48 is then tightened for retaining the tube 43 in a horizontal attitude. Marginal portions of a large bag are then inserted in the slots 44, and short tubes 47, provided at opposite ends of the tube 43, are moved inward to cover the slots and lock the portions of the bag mouth which were inserted in the slots securely in place. The ends of the tube 43 are slightly enlarged to prevent the accidental separation from the tube 43 of the tubes 47.

The base of the device includes a generally triangular metallic plate 50 which is curved upward toward the front to conform in contour to the member 14. The plate 50, through bearings 52, carries freely rotatable rollers 54.

I have described what I believe to be the best embodiment of my invention. What I desire to cover by letters patent, however, is set forth in the appended claims.

I claim:

1. A carrier device for refuse collecting bags comprising, in combination,
    a. an U-shaped frame having a stable base portion and front and rear upstanding arms,
    b. first and second bag supporting members carried in telescoping relation by the respective upstanding arms,
    c. means for adjustably, individually fixing the bag supporting members at desired levels relative to the upstanding arms according to the length of the bag chosen for use,
    d. an extensible coil spring carried by the first bag supporting member, said spring being anchored at one end to the spring carrying member and equipped at the other end with means for effecting detachable connection with a knotted portion of a bag mouth,
    e. a slotted member carried by the second bag supporting member adapted for detachable connection with another knotted portion of the bag mouth, and
    f. means carried by said second bag supporting member for spreading the bag mouth.

2. A carrier device for refuse collecting bags as set forth in claim 1 in which the first bag supporting member is hollow and normally houses the spring carried by it when no bag is present.

3. A carrier frame for refuse collecting bags as set forth in claim 2 in which the bag mouth spreading means comprises a pair of pivotally connected bag mouth spreading levers pivotally mounted on the upper end of the second bag supporting member, each lever having a downwardly extending, bag mouth spreading finger on its longer bag spreading arm, the longer spreading arm and the shorter handle arm of each lever being so related that the bag mouth is fully spread when the shorter handle arms are squeezed into substantial coincidence with one another against the resistance of the spring, and means carried by the second supporting member for fixing the shorter handle arms of the levers in substantial coincidence with one another.

4. A carrier frame for refuse collecting bags as set forth in claim 3 in which the handle arms of the levers are formed with holes which register with one another when the bag mouth is fully spread, and a pin is provided for insertion in said holes to maintain the spread condition of the bag mouth, together with means flexibly anchoring the pin to the second bag supporting member.

5. A carrier frame for refuse collecting bags as set forth in claim 2 in which a spreader bar for use with exceptionally wide mouth bags is normally affixed to the front upstanding arm of the frame in alignment therewith but may be transferred to a horizontal mounting in association with the slotted member carried by the second bag supporting member, said spreader bar having slots near its opposite ends for cooperation with marginal material of the bag and slidable sleeves on the bar for fixing the bag material in said slots.

6. A carrier frame for refuse collecting bags as set forth in claim 1 in which the stable base portion of the carrier frame includes a sheet metal member of tapering width from front to rear, which member is curved upward at its broader forward end and carries a pair of laterally spaced rollers which substantially engage the ground when the carrier is in a normal, idle condition.

7. A carrier frame for refuse collecting bags as set forth in claim 6 in which the second bag supporting member includes a rigid handle whereby the rear end of the carrier frame may be lifted for rolling the carrier frame and the bag carried by it to a new location.

* * * * *